(12) United States Patent
D'Andrea et al.

(10) Patent No.: US 12,261,640 B2
(45) Date of Patent: Mar. 25, 2025

(54) ANGLE INFORMATION ESTIMATION OF ULTRA-WIDEBAND WIRELESS SIGNALS

(71) Applicant: Verity AG, Zürich (CH)

(72) Inventors: Raffaello D'Andrea, Zürich (CH); Anton Ledergerber, Winterthur (CH)

(73) Assignee: Verity AG, Zurich (CH)

( * ) Notice: Subject to any disclaimer, the term of this patent is extended or adjusted under 35 U.S.C. 154(b) by 108 days.

(21) Appl. No.: 17/636,449

(22) PCT Filed: Aug. 19, 2020

(86) PCT No.: PCT/EP2020/073229
§ 371 (c)(1),
(2) Date: Feb. 18, 2022

(87) PCT Pub. No.: WO2021/032793
PCT Pub. Date: Feb. 25, 2021

(65) Prior Publication Data
US 2022/0321164 A1 Oct. 6, 2022

(30) Foreign Application Priority Data
Aug. 20, 2019 (CH) .................................... 01043/19

(51) Int. Cl.
*H04B 1/717* (2011.01)
*G01S 3/60* (2006.01)
(Continued)

(52) U.S. Cl.
CPC ................ *H04B 1/717* (2013.01); *G01S 3/60* (2013.01); *G01S 13/0209* (2013.01); *H04B 1/71632* (2013.01); *H04B 1/71637* (2013.01)

(58) Field of Classification Search
CPC .......... G01S 3/60; G01S 3/14; G01S 13/0209; H04B 1/717; H04B 1/71632; H04B 1/71637
See application file for complete search history.

(56) References Cited

U.S. PATENT DOCUMENTS

2016/0259032 A1* 9/2016 Hehn ...................... G01S 1/024
2016/0353238 A1* 12/2016 Gherardi ................ G05D 1/028
(Continued)

OTHER PUBLICATIONS

Ruiqing Ye, Stephen Redfield, and Huaping Liu, "High-Precision Indoor UWB Localization: Technical Challenges and Method", Proceedings of 2010 IEEE International Conference on Ultra-Wideband (ICUWB2010), 2010 (Year: 2010).*
(Continued)

*Primary Examiner* — Aristocratis Fotakis
(74) *Attorney, Agent, or Firm* — HALEY GUILIANO LLP

(57) ABSTRACT

The invention relates to a method and device for estimating angle information (50) of a received ultra-wideband wireless signal. Upon reception of a wireless signal emitted from a transmitting device (20) with known sounding sequence, the receiving device (10) estimates the channel impulse response (CIR), selects a portion of the channel impulse response (CIR), and estimates angle information (50) given the angle-dependent antenna transfer functions of either the transmitting device (20), the receiving device (10), or both. For this, the selected portion of the channel impulse response of the signal is fed into a neural network (73) which outputs an angle information probability distribution for the ultra-wideband wireless signal (50).

22 Claims, 7 Drawing Sheets

(51) Int. Cl.
*G01S 13/02* (2006.01)
*H04B 1/7163* (2011.01)

(56) References Cited

U.S. PATENT DOCUMENTS

| | | | | |
|---|---|---|---|---|
| 2017/0272119 | A1* | 9/2017 | McLaughlin | H04B 1/7073 |
| 2018/0052006 | A1* | 2/2018 | Ell | G01P 5/00 |
| 2019/0346268 | A1* | 11/2019 | He | G01S 1/0423 |
| 2020/0252101 | A1* | 8/2020 | McLaughlin | G01S 5/12 |
| 2020/0280952 | A1* | 9/2020 | Sasoglu | H04W 64/006 |

OTHER PUBLICATIONS

Klemen Bregar and Mihael Mohorcic, "Improving Indoor Localization Using Convolutional Neural Networks on Computationally Restricted Devices", Jozef Stefan Institute, Slovenia, Mar. 21, 2018, IEEE (Year: 2018).*
Anton Ledergerber and Raffaello D'Andrea, Ultra-Wideband Angle of Arrival Estimation Based on Angle-Dependent Antenna Transfer Function, Zurich, MDPI, Oct. 15, 2019 (Year: 2019).*
Brecht Hanssens, David Plets, Emmeric Tanghe, Claude Oestgesy, Davy P. Gaillotz, Martine Li'enardz, Luc Martens and Wout Joseph, "An Indoor Localization Technique Based on Ultra-Wideband AoD/AoA/ToA Estimation", IEEE, 2016 (Year: 2016).*
Dotlic et al ("Angle of Arrival Estimation Using Decawave DW1000 Integrated Circuits", 2017 14th Workshop on Positioning, Navigation and Communications (WPNC)) (Year: 2017).*
Ertel et al ("Angle and Time of Arrival Statistics for Circular and Elliptical Scattering Models", IEEE Journal on Selected Areas in Communications, vol. 17, No. 11, Nov. 1999) (Year: 1999).*
Liu et al ("An Approach to Robust INS/UWB Integrated Positioning for Autonomous Indoor Mobile Robots", MDPI, Sensors 2019, Feb. 23, 2019) (Year: 2019).*
Duroc et al ("UWB Antennas: Systems with Transfer Function and Impulse Response", IEEE Transactions on Antennas and Propagation, vol. 55, No. 5, May 2007) (Year: 2017).*
Kong et al ("TOA and AOD statistics for down link Gaussian scatterer distribution model", IEEE Transactions on Wireless Communications, vol. 8, No. 5, May 2009) (Year: 2009).*
Wang, Tianyu, Hanying Zhao, and Yuan Shen. "High-accuracy localization using single-anchor ultra-wide bandwidth systems." 2019 IEEE/CIC International Conference on Communications in China (ICCC). IEEE, Aug. 11, 2019.
Ledergerber Anton et al: "11 Angl e of Arrival Estimation based on Channel Impulse Response Measurements 11",2019 IEEE/RSJ International Conference on Intelligent Robots and Systems !ROS), IEEE, Nov. 3, 2019.
Bialer Oded et al: "11 Performance Advantages of Deep Neural Networks for Angle of Arrival Esti mati on11", ICASSP 2019—2019 IEEE International Conference on Acoustics, Speech and Signal Processing (ICASSP), IEEE, May 12, 2019.
Nerguizian C et al: "11 Geol ocati on in mines with an impulse response fingerprinting technique and neural networks 11", 2004 IEEE 60th Vehicular Technology Conference. VTC2004-FALL (IEEE Cat. No. 04CH37575) IEEE Piscataway, NJ, USA, IEEE, vol. 5, Sep. 26, 2004.
Chen Luan et al: "11 Probabili sti c Indoor Position Determination via Channel Impulse Response", 2018 IEEE 29th Annual International Symposium on Personal, Indoor and Mobile Radio Communications (PIMRC), IEEE, Sep. 9, 2018.
International Search Report for PCT/EP2020/073229 Dated Nov. 27, 2020.

* cited by examiner

ANGLE INFORMATION ESTIMATION OF ULTRA-WIDEBAND WIRELESS SIGNALS

CROSS-REFERENCE TO RELATED APPLICATION

This application is a National Stage application of International Patent Application No. PCT/EP2020/073229, filed on Aug. 19, 2020, which claims priority to Suiss Application No. 01043/19 filed on Aug. 20, 2019, each of which is hereby incorporated by reference in its entirety.

TECHNICAL FIELD

The present invention relates generally to ultra-wideband communication, localization and radar systems, and specifically to a method and device for estimating angle information of an ultra-wideband wireless signal.

BACKGROUND

The angle of arrival (AoA) and angle of departure (AoD) of wireless signals transmitted between a transmitting device and a receiving device can be estimated and used to determine the relative position and orientation (pose) between the two devices. In the case that the positions of multiple transmitting devices are known, a receiving device can estimate its pose by triangulation. Vice versa, if positions of multiple receiving devices are known, a transmitting device can be localized by fusing the AoA or AoD estimates of the receiving devices.

In radar systems, also termed device-free or passive localization systems, the AoA of a signal reflected back from an object can be used to localize the object (e.g. for aircraft tracking).

Multiple methods exist to estimate the AoA or AoD. They can be roughly categorized as follows:
- Methods using multiple transmitter or receiver antennas which employ beamforming using phased antenna arrays and/or measure the phase difference of departure/arrival,
- methods using a single transmitter or receiver antenna which transmit and/or receive the wireless signal at multiple locations,
- methods using rotational or otherwise mechanically movable directional antennas,
- methods using actively controlled parasitic antennas with variable loads, and
- methods using a combination of the above.

However, these methods lead in general to electronically and/or mechanically complex, expensive and power-hungry devices.

SUMMARY

It is therefore an object of the present invention to at least partially overcome these drawbacks.

This object is achieved by the method and device of the independent claims.

Accordingly, as a first aspect of the invention, a method for estimating angle information of an ultra-wideband (UWB) radio signal comprises the following steps:

Receiving, by means of a receiver antenna of a receiving device, said ultra-wideband radio signal. Thus, the received radio signal can be analyzed for further processing. Advantageously, the receiver antenna has an angle-dependent transfer function, such that signals received with different AoAs look differently in time or frequency domain. Examples for obtaining such an antenna range from customized antenna designs to implicit antenna-angle-dependencies resulting from adjacent packaging, nearby electronic components etc. This simplifies further processing of the signals.

In another step of the method, the channel impulse response (CIR) of the propagation channel of said received UWB radio signal is derived. This is done by correlating a known sounding sequence contained in said received UWB radio signal with its template signal. As an alternative or in addition, an envelope function indicative of an envelope of said CIR can be derived. This simplifies further processing.

Then, in another step of the method, using the CIR or its envelope function as derived before, an angle information probability distribution for said UWB radio signal is derived. Thus, information about the AoA or AoD of the UWB radio signal is obtained.

It should be noted here that the method of the invention is also feasible for more than one receiver antenna. A person with ordinary skill in the art will understand that the term "a receiver antenna" implies "at least one receiver antenna".

Then, in such a preferred embodiment of the method, phase differences of the ultra-wideband radio signal are measured at different antennas and combined with the angle information probability distribution (as calculated and assumed to be identical for all antennas which are close to each other or as calculated separately for each single antenna).

This helps to resolve phase ambiguities and helps to improve the performance of the method.

In a preferred embodiment, the method comprises a further step of deriving a first path location within said derived CIR or its envelope function. Thus, unwanted information, e.g., resulting from reflections of the radio signal at surfaces is easier to neglect.

Then, (only) the first path location is used for deriving said angle information probability distribution. This simplifies the derivation of the angle information and can yield better results. Advantageously, a first path window is selected of said CIR or said envelope around said first path location. The selected first path window is advantageously (solely) used for deriving the angle information probability distribution. A person with ordinary skill in the art will understand that the first path window can also be used in combination with other functions for deriving the angle information probability distribution.

Advantageously, a transmitting device transmitting said UWB radio signal has a transmitter antenna with an angle-dependent antenna transfer function, such that the emitted signals have a different shape in time and frequency domain depending on the angle of departure (AoD). Examples for obtaining such an antenna range from customized antenna designs to implicit antenna-angle-dependencies resulting from adjacent packaging, nearby electronic components etc. This simplifies further processing of the signals.

In a preferred embodiment, the angle information distribution probability is derived using a neural network. The neural network is built using an input layer for said CIR, said envelope function, and/or said first path window and trained using a supervised learning algorithm to output the angle information probability distribution. As known to a person with ordinary skill in the art, after training and after passing the input through standard hidden layers, the output layer is then indicative of the angle information probability distribution.

In a preferred embodiment of the method, the ultra-wideband radio signal comprises data indicative of a transmitter antenna transfer function of a transmitting device of said ultra-wideband radio signal. Particularly, the transmitting device transmits its own transmitter antenna transfer function (or data indicative thereof) embedded in said ultra-wideband radio signal.

The data indicative of said transmitter antenna transfer function can then be used for deriving said angle information probability distribution for said ultra-wideband radio signal which helps to improve the accuracy of the probability distribution.

Particularly, the data indicative of the transmitter antenna transfer function is fed into the input layer of a neural network as discussed above (either directly as a separate input to the neural network or indirectly to deconvolute said CIR or said envelope function before feeding it to said neural network). This helps the neural network to more accurately predict the angle information probability distribution as it then does not need to generalize the angle information over radio signals from different transmitter antennas.

This improves the accuracy of the angle information probability distribution.

Advantageously, not only the channel impulse response or its envelope function, but also timing information is retrieved from said UWB radio signal. Based on the timing information, the time-of-flight (ToF) of said UWB radio signal is calculated. It is then possible to also feed this time-of-flight (ToF) estimate to the input layer of said neural network. This helps the neural network to more accurately predict the angle information as it then does not need to generalize the angle information over radio signals with different time-of-flights (ToF). This improves the accuracy of the angle information probability distribution.

In a preferred embodiment of the method, sensor information indicative of the state of the receiving device is acquired by means of a sensor. This helps to gain additional information which can be fed into the neural network and which helps to improve the accuracy of the angle information probability distribution.

Then, in another preferred embodiment, state information such as pose and velocity information of said receiving device is derived by fusing at least one of said angle information probability distribution, said timing information and said sensor information Pose and velocity information can be used two-fold. On the one hand, the target angle information can be calculated based on the pose and velocity information if the position of the transmitter antenna or both the position and orientation of the transmitter antenna are known. This enables to online train (e.g. by modifying a configuration of the neural network) the neural network during operation such that a subsequent angle information probability distribution is more accurate than a prior one. On the other hand, pose and velocity information can again be fed as inputs to the neural network, helping it to more accurately predict the angle information. For instance, the accuracy can be improved by reducing the error of the maximum a-posteriori angle estimate. In another example, it can also be improved by the uncertainty prediction associated to this estimate. A person with ordinary skill in the art will understand that the aforementioned examples are not limiting and that similar techniques can be used to improve the accuracy of the angle information.

As another aspect of the invention, an angle estimator for estimating angle information of a UWB radio signal by means of any of the previously described methods comprises:
 a receiver or transceiver structured for receiving said ultra-wideband signal via at least one receiver antenna,
 a control unit comprising
  memory, to store software and configurations to execute any of the previously described methods, and
  a processor or multiple processors executing the software contained in said memory.

The control unit is specifically structured for deriving the CIR of a propagation channel of said received UWB radio signal or an envelope function indicative of an envelope of said CIR. Further, it is structured for deriving, using said CIR or said envelope function, the angle information probability distribution for said UWB radio signal.

In a preferred embodiment, the angle estimator further contains
 at least one sensor such as an inertial measurement unit (IMU), or a geolocation sensor such as a GPS module providing sensor information such as pose and velocity information. This helps to gain additional information which can be used to improve the accuracy of the angle information probability distribution.

In a preferred embodiment, the angle estimator is equipped with a receiver antenna having an angle-dependent antenna transfer function. This enables to estimate the angle-of-arrival of said received UWB radio signal more easily.

Advantageously, if only the angle-of-departure is to be estimated, only the transmitter antenna of said received UWB radio signal can have an angle-dependent transfer function and said receiving antenna does not have an angle-dependent transfer function.

In yet another advantageous embodiment, the angle estimator further comprises a neural network with an input layer for at least one of said channel impulse response, said envelope function, and/or said first path window. The neural network has an output layer indicative of said angle information probability distribution. Thus, the angle information is easier to derive, in particular without the use of bulky, expensive, electronically and/or mechanically complex, and/or power hungry parts.

Advantageously, said ultra-wideband radio signal comprises data indicative of a transmitter antenna transfer function of a transmitting device of said ultra-wideband radio signal. Then, the control unit of the angle estimator is structured for using this data indicative of said transmitter antenna transfer function (preferably by feeding it into the neural network as described above either directly as a separate input to the neural network or indirectly to deconvolute said CIR or said envelope function before feeding it to said neural network) for deriving said angle information probability distribution for said ultra-wideband radio signal. This helps the angle estimator to more accurately predict the angle information probability distribution as it then does not need to generalize the angle information over radio signals from different transmitter antennas. This improves the accuracy of the angle information probability distribution.

As another aspect of the invention, a computer program product for estimating angle information of an ultra-wideband radio signal comprises a computer readable storage medium having program instructions embodied therewith, wherein the program instructions are executable by one or more processors of a computerized system to cause the computerized system to:
- receive, by means of a receiver antenna of a receiving device, said ultra-wideband radio signal,
- derive a channel impulse response of a propagation channel of said received ultra-wideband radio signal or an envelope function indicative of an envelope of said channel impulse response, and
- derive, using said channel impulse response or said envelope function, an angle information probability distribution for said ultra-wideband radio signal, in particular by feeding at least one of said channel impulse response or said envelope function into a neural network having an input layer for at least one of said channel impulse response and/or said envelope function and having an output layer indicative of said angle information probability distribution.

Throughout the description, the term "angle information" refers to an angle of arrival (AoA) probability distribution of a received radio signal or an angle of departure (AoD) probability distribution of a transmitted radio signal, also termed direction of arrival probability distribution and direction of departure probability distribution, respectively.

The term "ultra-wideband radio signal" refers to a radio signal with a bandwidth that exceeds the lesser of 500 MHz or 20% of the arithmetic center frequency of the radio signal.

A person with ordinary skill in the art will understand that the method also works with radio signals with a smaller bandwidth. For example, radio signals that are spread over a bandwidth that exceeds the lesser of 125 MHz or 5% of the arithmetic center frequency; or radio signals that are spread over a bandwidth that exceeds the lesser of 250 MHz or 10% of the arithmetic center frequency; or radio signals that are spread over a bandwidth that exceeds the lesser of 375 MHz or 5% of the arithmetic center frequency.

Radio signals with a bandwidth in the range of 400-1200 MHz, 10-5000 MHz, 50-2000 MHz, 80-1000 MHz can also be used. The bandwidth can also be split over different narrower frequency bands for transmission and reassembled at the receiver and the method would still work. Note also that a lot of fifth generation (5G) mobile phone signals can be termed UWB signals according to these definitions as will be understood by a person with ordinary skill in the art.

The term "timing information" may refer to the time of departure (ToD), the time of arrival (ToA), the time difference of arrival (TDoA) or the time difference of departure (TDoD) of transmitted radio signals.

The term "state information" refers to information indicative of a state of the (receiving device of the) angle estimator such as linear and rotational speed, and/or position and/or orientation (pose).

The term (data indicative of a) "transmitter antenna transfer function" refers to information indicative of the transfer function of the transmitting antenna, such as the sampled transmit antenna impulse response function, its Fourier transform, or metrics thereof.

The term "online training a neural network" refers to the parameter adjustment of neural network during operation. Hence at the same time that the neural network is evaluated to make predictions, also its parameters are adjusted. This is in contrast to the standard approach, where first a neural network is trained, and then predictions are made while keeping the neural network's parameters (e.g. weights of the connections between the single neurons/layers) constant.

The "propagation channel" of an ultra-wideband signal is fully characterized by its "channel impulse response" (CIR).

All propagation effects, such as the antenna transfer function and multi-path arrivals, leave a trace in the CIR.

The described embodiments likewise refer to the method claims and the device claims. As it is apparent to a person with ordinary skill in the art, synergistic effects may arise from the combination of features of different embodiments, although these may not be described in detail.

BRIEF DESCRIPTION OF THE DRAWINGS

The invention will be better understood and objects other than those set forth above will become apparent when consideration is given to the following detailed description thereof. This description makes reference to the annexed drawings, wherein.

DETAILED DESCRIPTION

Assuming a cascaded, linear and time invariant model for a wireless ultra-wideband propagation channel with $N_{MP}$ multipath components, its channel impulse response (CIR) 61 in time domain $h_{CIR}$ can be written as $$h_{CIR} = \sum_{n=1}^{N_{MP}} h_{tx}(\alpha_{tx,n}) * h_{env,n} * h_{rx}(\alpha_{rx,n})$$ [Eq. 1]

where $h_{tx}(\alpha_{tx,n})$ and $h_{rx}(\alpha_{rx,n})$ are the AoD $\alpha_{tx,n}$, AoA $\alpha_{rx,n}$ dependent impulse responses of the transmitter 21 and receiver antenna 11, respectively, where $h_{env,n}$ is the impulse response of the environment for the n-th multipath component, and where * is the convolution operator. This is visualized in FIG. 1.

The effects of electromagnetic wave interactions with material belonging to the same rigid body as the antennas are included in the impulse response of the transmitter 21 or receiver 11 antenna to simplify terminology. Hence an AoA- or AoD-dependent antenna transfer function can be a result of either a non-isotropic antenna or by material belonging to the same rigid body as the antenna, which acts similarly to parasitic elements in multi-element antennas (as for example used in multi-element Yagi antennas).

So far, the focus of antenna engineers has been on designing either directional or omnidirectional antennas showing a similar transfer function for all angles with a significant gain. Furthermore, the antennas have been mounted on devices such that their radiation characteristics were not influenced by the devices. This allows to achieve a constant antenna transfer functions for all angles with a high antenna gain. Instead, the method presented herein suggests to amplify the angle dependency of the antenna transfer function in order to infer the AoA, AoD from the CIR 61 estimate.

Figure 1:
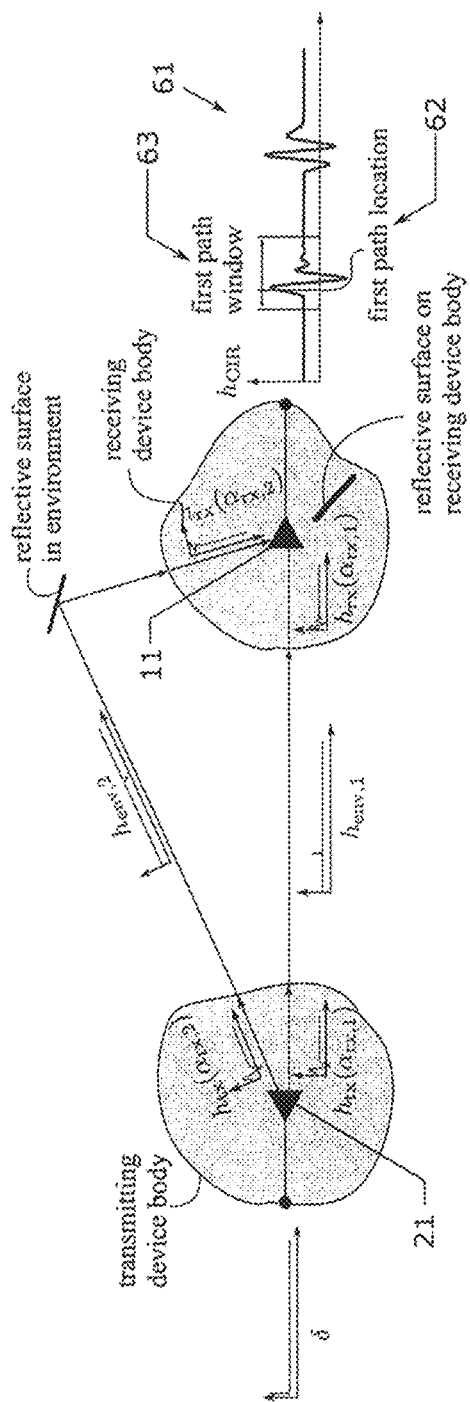
FIG. 1 shows the composition of an example channel impulse response (CIR) 61 with marked first path location 62 and first path window 63.

From Eq. 1 it is visible that in case of a multi-path transmission channel, the measured CIR 61 is dependent on the transfer function of multiple AoA and AoD as shown in FIG. 1 for a propagation channel having a direct and an indirect path. In order to limit the effect of AoA or AoD transfer functions not corresponding to the desired first path (note that for radar applications the first path corresponds to the path of the signal directly reflected back from the target object), only a first path window 63 of the CIR 61 containing the desired first path location 62 is taken into consideration as highlighted in FIG. 1. This window size must be adapted to the pulse duration, the center frequency of the ultra-wideband (UWB) signal, and the environment for best performance.

Antenna transfer function including the effects of objects in its vicinity are difficult to physically model and the transfer function of the environment is often unknown.

Additionally, the antenna transfer function might be similar for two different angles, therefore it is difficult to find an analytic formula mapping a measured CIR to an AoA, AoD. Instead machine learning tools enable to acquire data-driven models providing probability distributions as their outputs, as will be shown below.

In consideration of this knowledge and the complex, costly and power-hungry hardware of state of the art AoA, AoD estimation approaches, the present invention provides an AoA, AoD estimation method having a simpler hardware configuration, enabling smaller, low-power devices to estimate the angle information using less actively mechanically or electronically controlled elements.

Figure 2:
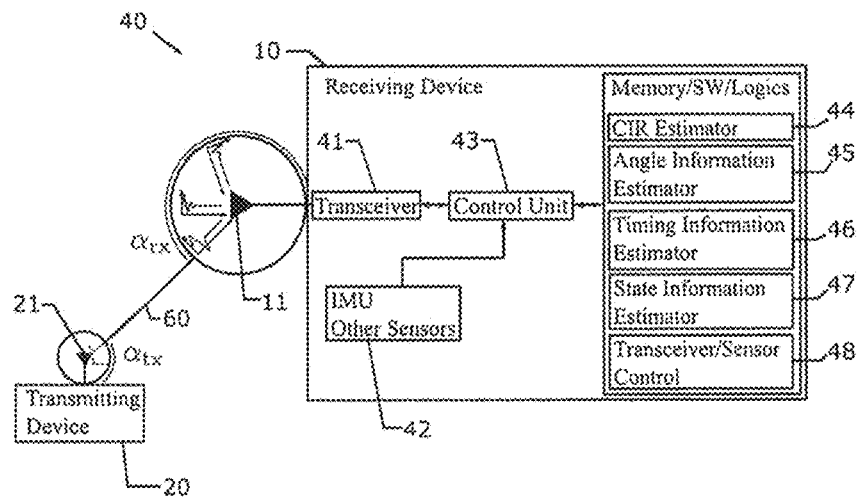
FIG. 2 shows a block diagram of an ultra-wideband wireless (UWB) angle estimator 40 according to the invention comprising a receiver antenna 11 and a receiving device 10.

The angle estimator 40 according to the invention to estimate angle information from a UWB signal comprises the following components, which are shown in FIG. 2:

At least one receiver antenna 11 with an angle-dependent transfer function. Alternatively, electromagnetic wave reflective or absorptive material can be placed on the same rigid body and in the vicinity of the antenna 11 (as is often the case when the antenna is integrated in a device or mounted on a device). This material will also lead to angle-dependent antenna transfer function.

A transceiver 41 in a receiving device 10 reading the signal from the receiver antenna 11.

A control unit 43 comprising memory and a processor for storing and executing software in the memory and controlling the angle estimator 40 accordingly.

A CIR estimator 44 for deriving a CIR response 61 of a propagation channel of said received ultra-wideband radio signal 60 or an envelope function 64 indicative of an envelope of said channel impulse response 61.

An angle information estimator 45 deriving, using said CIR 61 or said envelope function 64, an angle information probability distribution 50 for said ultra-wideband radio signal 60.

Figure 3:
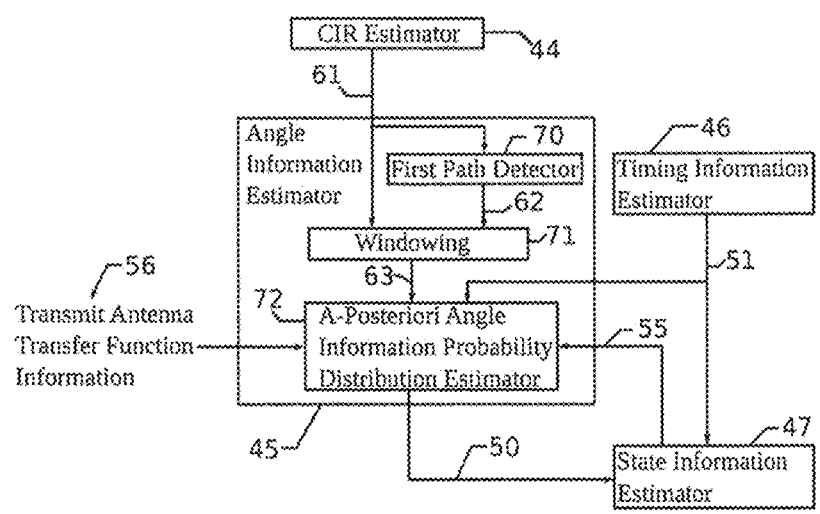
FIG. 3 shows a flow chart depicting the operation of the angle estimator 40 of FIG. 2 to estimate the angle information 50.

These core components together with components used in other realizations will be discussed in detail in the following paragraphs and in FIG. 3 and FIG. 4. Note that each estimator and control module as shown in FIG. 2 contains a database that may store configuration information, and logging data necessary for its operation.

Also note that at least some or all of the components as shown and discussed herein separately can be implemented in software running on the control unit 43.

The transmitter antenna 21 emits a sounding sequence contained in the UWB radio signal 60 and known to the receiving device with a certain angle-dependent transfer function. This signal excites the receiver antenna 11 with a certain angle-dependent transfer function. The transceiver 41 samples this excitation, which allows the CIR estimator 44 to estimate the CIR 61 or—alternatively or in addition—an envelope function 64 of the CIR. This CIR estimate 61 is then fed to the angle information estimator 45 which is shown in FIG. 3. A leading-edge detections algorithm implemented in the first path detector 70 finds the first path location 62 in the CIR 61. Samples in a window 63 around this first path location 62 are fed to an a-posteriori angle information probability distribution estimator 72. This estimator outputs the a-posteriori angle-information probability distribution 50, that the signal was received with a certain AoA, AoD $$p(\alpha_{tx}, \alpha_{rx}|h_{CIR})$$

Note that in case only the AoA is to be estimated, i.e. the probability distribution p, it is beneficial to use a transmitter antenna 21 with an isotropic transfer function on the transmitting device 20, while a receiver antenna 11 with an angle-dependent transfer function must be used on the receiving device 10.

Note that in case only the AoD is to be estimated, i.e. the probability distribution p, it is beneficial to use an receiver antenna 11 with an isotropic transfer function on the receiving device 10, while a transmitter antenna 21 with angle-dependent transfer function must be used on the transmitting device 20.

Note that in case that either a state information estimator 47 or a timing information estimator 46 is able to provide an estimate of the time-of-flight (ToF) 51 of the received signal, it is beneficial to condition the probability distribution not only on the window 63 of the estimated CIR, but also on the estimated ToF $\tau$ 51, i.e.

$$p(\alpha_{tx}, \alpha_{rx}|h_{CIR}, \tau).$$

Note that in case transmit antenna transfer function information 56 is transmitted with the ultra-wideband radio signal 60, it is beneficial to condition the probability distribution not only on the window 63 of the estimated CIR, and the estimated ToF 51 (if available), but also on the antenna transfer function information 56 indicative of the transmitter antenna impulse response function $h_{tx}(\alpha_{tx})$, i.e.

$$p(\alpha_{tx}, \alpha_{rx}|h_{CIR}, \tau, h_{tx}(\alpha_{tx})),$$

or by deconvoluting the channel impulse response 61 first with the transmitter antenna transfer function information.

Figure 4:
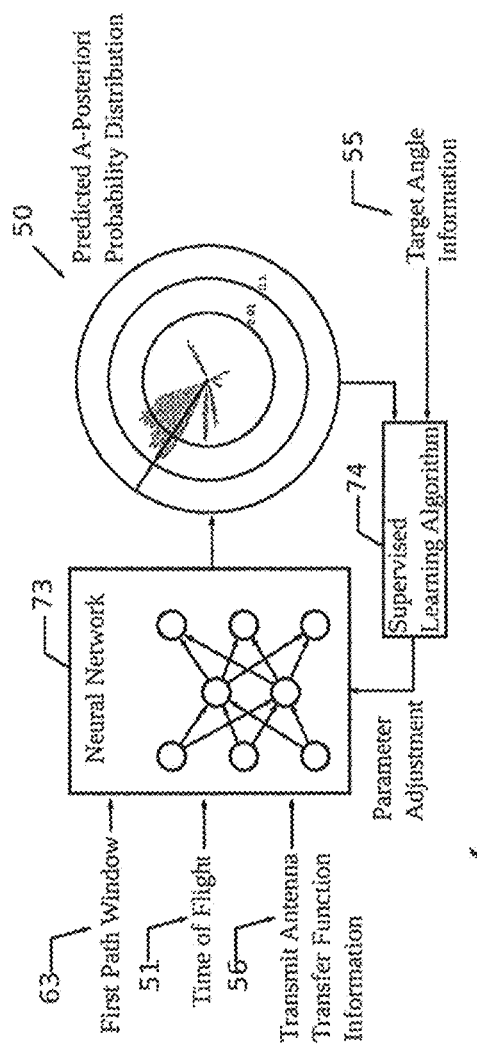
FIG. 4 shows a block diagram of the a-posteriori angle information probability estimator 72 as implemented in the angle information estimator 45 of FIG. 3, and how it can be trained using a supervised learning approach 74.

The a-posteriori angle information probability distribution estimator 72 is based on a neural network 73 and outputs either a discretized probability distribution, or the parameters of a continuous probability distribution as visualized in FIG. 4. The inputs to the neural network 73 are the CIR samples contained in the first path window 63, as well as the ToF 51 and/or state information 53 based on sensor information 54, if available.

If a discretized probability distribution is used, the angular information probability distribution is represented by $N_{bin}$ bins, each representing the probability that the AoA, AoD take a certain value. Denoting with $z \in R^{N_{bin}}$ the unnormalized log probabilities of each bin outputted by the neural network 73, the normalized probability that a signal's angle information belongs to bin $i \in \{1,2, \ldots, N_{bin}\}$ is $$p(\text{bin}=i|h_{CIR},\tau)=\exp(z[i])/(\Sigma_{j=1}^{N_{bin}}\exp(z[j])).$$

Figure 5:
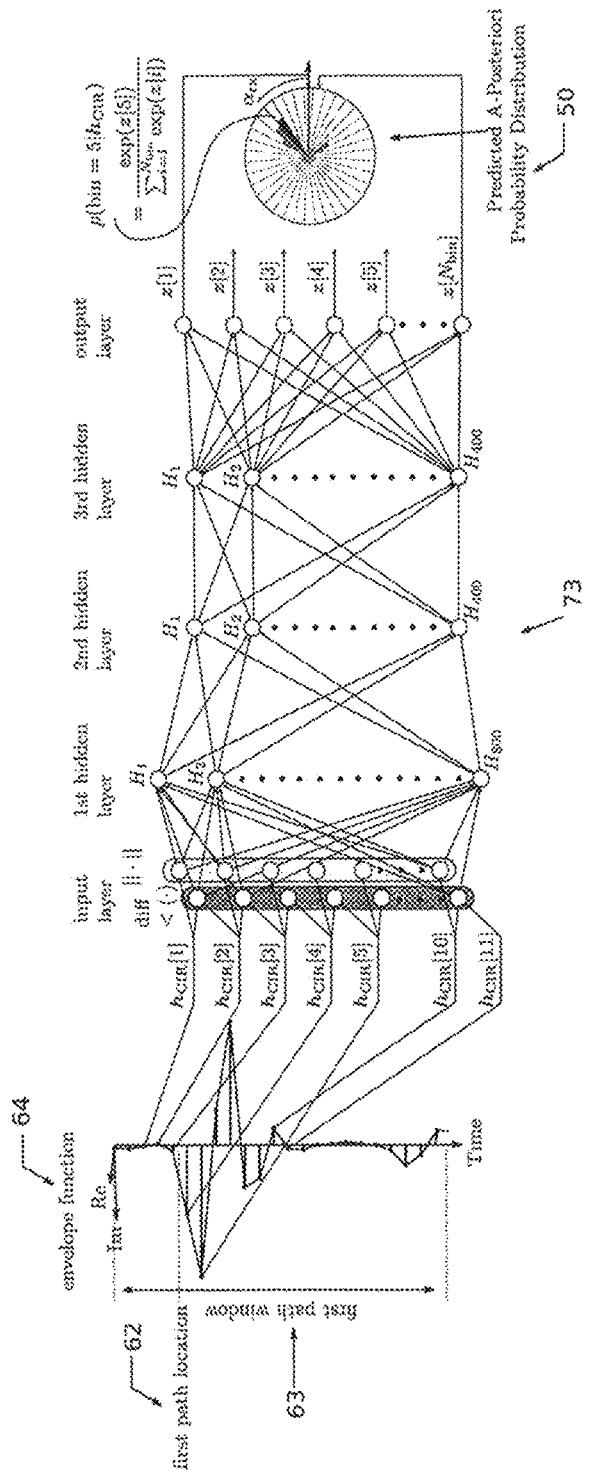
FIG. 5 shows an implementation of the neural network 73 of FIG. 4, having the first path window 63 of the envelope function 64 as input, and the predicted angle information probability distribution 50 as output.

Such a neural network 73 outputting a discretized probability distribution is visualized in FIG. 5. The samples of the envelope function 64 falling into the first path window 63 are fed as magnitude and phase to the input layer of the neural network 73, and the information is then passed through three hidden layers comprising 800, 400, and 400 neurons, each, to the output layer of the neural network 73.

A person with ordinary skill in the art will understand that the visualized fully connected neural network can be replaced convolutional neural network, a complex neural network, or any other parametrization suitable for training with a supervised learning algorithm.

If a continuous probability distribution is used, the neural network 73 is trained to output a parameterization of a selected distribution. If either the AoA or the AoD are estimated, a mixture of K von Mises-Fisher distributions is used. In case both AoA and AoD are estimated, a mixture of K bivariate von Mises-Fisher distributions is used. K must be chosen based on the selected antennas and the environment.

The neural network 73 is trained using a supervised learning algorithm 74. The training data consist of angle information-CIR window pairs and are augmented by ToF data in case these are available. Denoting with $\hat{\alpha}_{rx}$ the target AoA 55, the cross-entropy loss J per training data which the supervised learning framework is trying to minimize over all training data is given as $$J=-\log p(\alpha_{rx}=\hat{\alpha}_{rx}|h_{CIR},\tau).$$

This is done accordingly also for the case where the AoD, or both the AoA and AoD distributions are estimated and similarly if the probability distribution is also conditioned on the ToF or the transmitter antenna transfer function information.

Note that this supervised learning algorithm 74 can also be run during operation if the target angle information 55 is supplied by a state information estimator 47 in form of the predicted angle information.

Even though the timing information estimator 46 is optional for the device to estimate the angle information 50 from a wireless UWB signal 60, it enhances its capabilities. By estimating the time of arrival (ToA) of a received signal and by scheduling the time of departure (ToD) of a signal which is to be transmitted, the ToF between two devices can be estimated. To this end, the transceiver control software 48 must control the transceiver in accordance with a two-way ranging protocol if the clocks on the transceivers are not synchronized. In case of radar applications, these ToD and ToA estimates enable to estimate the distance of the transmitter-object-receiver path. These ToF estimates can be used as inputs to the angle information estimator 45, and as inputs to the state information estimator 47. Even if only (ToA) estimates are at hand, they can still be used as inputs to the state information estimator 47 which in turn can also provide a ToF estimate to the angle information estimator 45.

The state information estimator 47 estimates the pose and velocity of the device by fusing
- angle information 50 obtained from multiple transmitters with known locations (and orientation in case the AoD information is used),
- timing information in case a timing information estimator 46 is embodied in the device,
- and information from any other sensor 54 embodied in the device, e.g. an inertial-measurement unit
- with a motion model (if one is available) to produce an estimate of the pose and velocity of the device.

In one embodiment of the method, different center frequencies of the ultra-wideband communication channel are employed by the transmitting 20 and receiving device 10 and an a-posteriori angle information probability distribution estimator 72 is trained for each. By fusing the a-posteriori angle information probability distributions 50, ambiguities due to similar antenna transfer function for two different angles for a certain center frequency can be resolved.

In another embodiment of the method, not the channel impulse response 61, but its complex envelope 64 is fed either as complex numbers, or as magnitude and phase to the neural network 73. A person with ordinary skill in the art will understand that other characteristics of the estimated CIR 61 can be used as inputs to the neural network 73 as long as they are correlating with the antenna transfer function for different angles.

In case that a multi-band communication channel is used for communication, the necessary bandwidth to extract angle information 50 from the measured signal can be achieved by combining the CIR estimates 61 of each band.

In case that the transmitter and the receiver employ incoherent clocks, the CIR estimates 61 over different signals can be acquired. Upon each signal reception, the CIR 61 is sampled at a different time. This enables the accumulation of a CIR with a higher resolution. The performance of the presented device can be increased if such high-resolution CIR estimates are used as inputs to the a-posteriori angle information probability distribution estimator. Alternatively, instead of accumulating a high-resolution CIR over different signals, also the a-posteriori probability distributions can be accumulated and fused into one final a-posteriori distribution, which also leads to an increased performance of the presented device.

Figure 6:
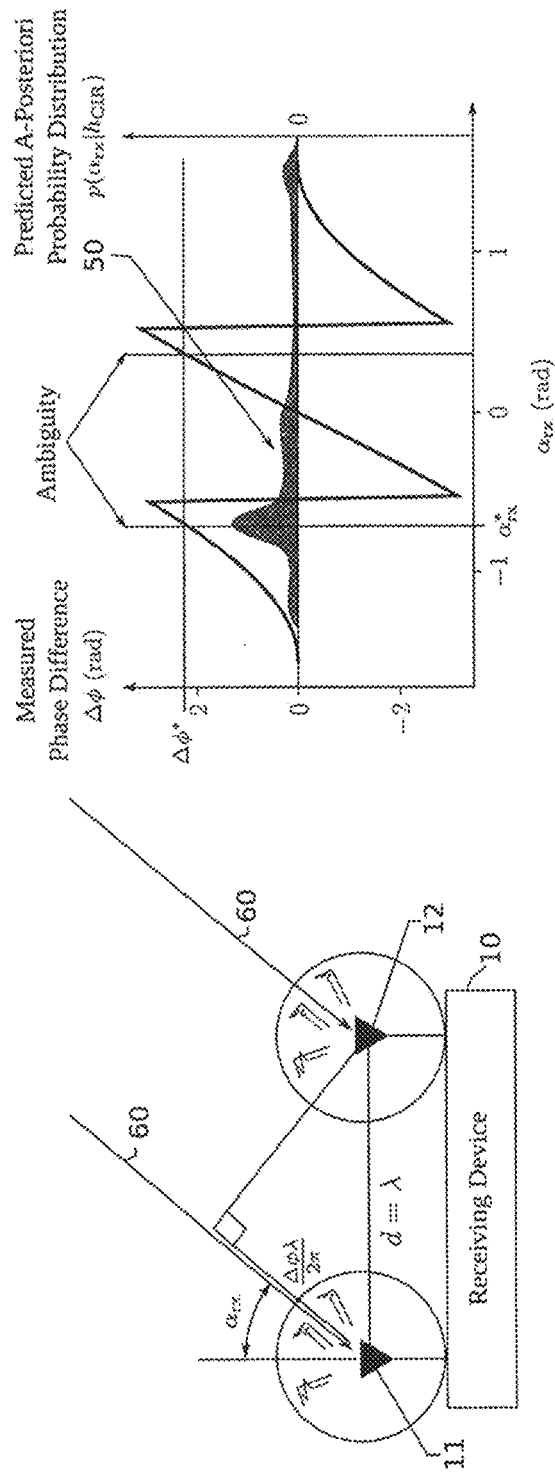
FIG. 6 shows on the left a receiving device 10 according to the invention equipped with two receiver antennas 11, 12, with a distance of d=λ, where λ is the wavelength of the carrier of the UWB signal 60. The measured phase difference Δϕ corresponds to several possible angle of arrivals, which can be disambiguated by the estimated angle information 50 as shown on the right.

In case the receiving device 10 has multiple receiving antennas 11, 12, the corresponding angle probability distributions 50 can be combined with phase difference $\Delta\phi$ measurements of the different antennas. This allows to resolve phase ambiguities as illustrated in FIG. 6, where a setup with two receiver antennas 11, 12 is shown, the first receiver antenna 11 being placed one wavelength $\lambda$ (of the carrier of the UWB signal 60) apart from the second receiver antenna 12.

Figure 7:
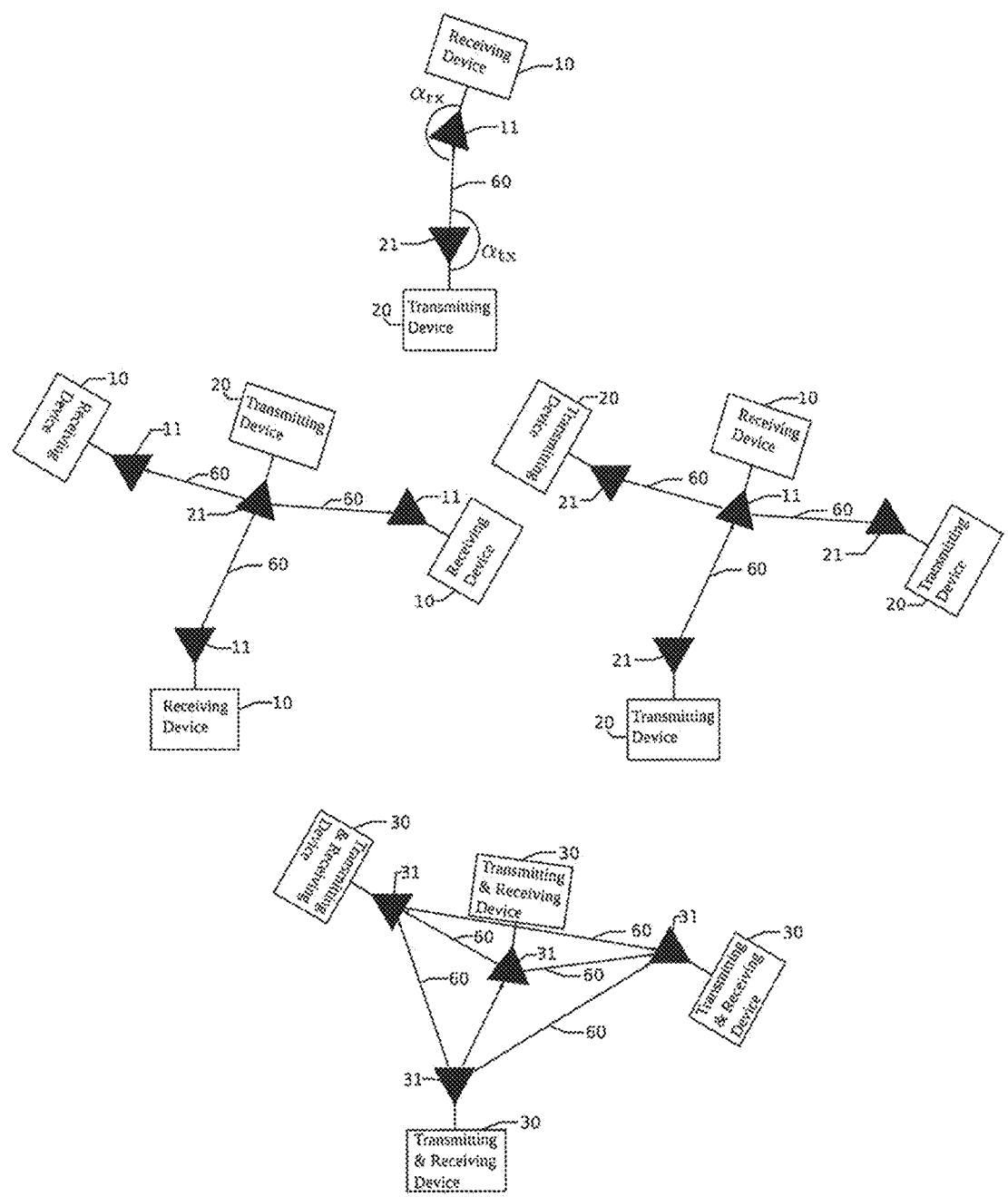
FIG. 7 shows block diagrams of four different wireless networks, each comprising at least one receiving device 10, 30, at least one transmitting device 20, 30, or at least one receiving and transmitting device 30 according to the invention.

The presented method to estimate angle information can be used in multiple setups as visualized in FIG. 7. A receiving device 10 can estimate its relative orientation with respect to a transmitting device 20, or multiple receiving devices 10 can localize a transmitting device 20 by fusing the estimated angle information 50

In another implementation, a receiving device 10 can localize itself by fusing angle information 50 acquired from multiple transmitting devices 20. In case all modules in a networked system employ the proposed method and device, the complete network structure can be estimated.

Figure 8:
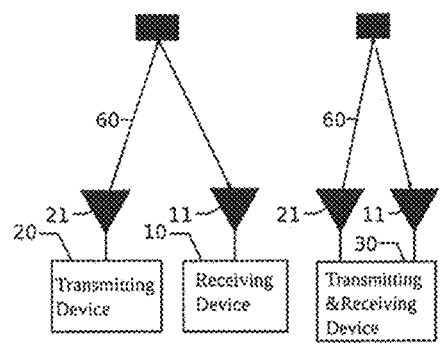
FIG. 8 shows two block diagrams of radar applications comprising a receiving device 10 and a transmitting device 20 or a receiving and transmitting devices 30, respectively, according to the invention.

In another embodiment of the invention, the AoA of a reflected UWB wireless signal is estimated. This enables to localize objects in radar applications if combined with ToF measurements, as visualized in FIG. 8.

Canceled.

The present invention may be practiced as a method or device adapted to practice the method. It is understood that the examples in this application are intended in an illustrative rather than in a limiting sense. In accordance with the present disclosure, limitations of current systems for localizing have been reduced or eliminated. While certain aspects of the present invention have been particularly shown and described with reference to exemplary embodiments thereof, it will be understood by those of ordinary skill in the art that various changes in form and details may be made therein without departing from the spirit and scope of the present invention as defined by the following claims. It will also be understood that the components of the present disclosure may comprise hardware components or a combination of hardware and software components. The hardware components may comprise any suitable tangible components that are structured or arranged to operate as described herein. Some of the hardware components may comprise processing circuitry (e.g., a processor or a group of processors) to perform the operations described herein. The software components may comprise code recorded on tangible computer-readable medium. The processing circuitry may be configured by the software components to perform the described operations. It is therefore desired that the present embodiments be considered in all respects as illustrative and not restrictive.

What is claimed is:

1. A method for estimating angle information of an ultra-wideband radio signal, the method comprising:
receiving, by means of at least one receiver antenna of a receiving device, said ultra-wideband radio signal,
deriving a channel impulse response of a propagation channel of said received ultra-wideband radio signal or an envelope function indicative of an envelope of said channel impulse response,
acquiring, by means of a sensor, sensor information indicative of a state of said receiving device, and
deriving, by inputting said channel impulse response or said envelope function into a neural network, an angle information probability distribution for said ultra-wideband radio signal, wherein the sensor information indicative of the state of the receiving device is also input into the neural network to improve the accuracy of the angle information probability distribution.

2. The method of claim 1, further comprising:
deriving a first path location within said derived channel impulse response or said envelope function, wherein said first path location is used for deriving said angle information probability distribution.

3. The method of claim 2 wherein:
said deriving said first path location further comprises selecting a first path window of said channel impulse response or said envelope function around said first path location; and
said selected first path window is used for deriving said angle information probability distribution.

4. The method of claim 1 wherein said receiver antenna has an angle-dependent transfer function.

5. The method of claim 1, further comprising:
transmitting, by means of a transmitter antenna of a transmitting device, said ultra-wideband radio signal, wherein said transmitter antenna has an angle-dependent transfer function.

6. The method of claim 1 wherein said neural network has an input layer for at least one of said channel impulse response, said envelope function, and/or a first path window and an output layer indicative of said angle information probability distribution.

7. The method of claim 6 further comprising:
deriving timing information from said received ultra-wideband radio signal,
deriving, using said timing information, a time-of-flight estimate of said received ultra-wideband radio signal, and
feeding said time-of-flight estimate into said neural network and using said time-of-flight estimate for deriving said angle information probability distribution.

8. The method of claim 1 further comprising:
deriving state information of said receiving device using at least one of said angle information probability distribution and said sensor information,
feeding said state information into said neural network, and
using said state information to online train the neural network.

9. The method of claim 1 further comprising:
modifying a configuration of said neural network.

10. The method of claim 5 wherein said ultra-wideband radio signal comprises data indicative of the transfer function of the transmitter antenna of the transmitting device, and wherein said data indicative of said transfer function is used for deriving said angle information probability distribution for said ultra-wideband radio signal.

11. The method of claim 1 wherein said ultra-wideband radio signal is received by at least two antennas of the receiving device, and wherein the method further comprises:
measuring a phase difference of the ultra-wideband radio signal as received by the at least two antennas, and
combining the measured phase difference with the derived angle information probability distribution.

12. An angle estimator for estimating angle information of an ultra-wideband radio signal by means of the method of claim 1, the angle estimator comprising:
a transceiver with the at least one receiver antenna structured for receiving said ultra-wideband radio signal,
at least one sensor structured for providing the sensor information indicative of the state of the angle estimator,
a control unit structured for
said deriving the channel impulse response of the propagation channel of said received ultra-wideband radio signal or the envelope function indicative of the envelope of said channel impulse response, and
said deriving, by inputting said channel impulse response or said envelope function into a neural network, the angle information probability distribution for said ultra-wideband radio signal, and
wherein the sensor information indicative of the state of the receiving device is also input into the neural network to improve the accuracy of the angle information probability distribution.

13. The angle estimator of claim 12 wherein:
said control unit is further structured for:
deriving a first path location within said derived channel impulse response, and selecting a first path window of said channel impulse response or said envelope function around said first path location, and said selected first path window is used for deriving said angle information probability distribution.

14. The angle estimator of claim 12, wherein said receiver antenna has an angle-dependent transfer function.

15. The angle estimator of claim 12 wherein the neural network has an input layer for at least one of said channel impulse response, said envelope function, and/or a first path window and an output layer indicative of said angle information probability distribution.

16. The angle estimator of claim 12 wherein said ultra-wideband radio signal comprises data indicative of a transmitter antenna transfer function of a transmitting device of said ultra-wideband radio signal, and wherein said control unit is structured for using said data indicative of said transmitter antenna transfer function for deriving said angle information probability distribution for said ultra-wideband radio signal.

17. A computer program product for estimating angle information of an ultra-wideband radio signal using the method of claim 1, the computer program product comprising a non-transitory computer readable storage medium having program instructions embodied therewith, wherein the program instructions are executable by one or more processors of a computerized system to cause the computerized system to:

said receive, by means of the at least one receiver antenna of the receiving device, said ultra-wideband radio signal, said derive the channel impulse response of the propagation channel of said received ultra-wideband radio signal or the envelope function indicative of the envelope of said channel impulse response, and said derive, by inputting said channel impulse response or said envelope function into a neural network, the angle information probability distribution for said ultra-wideband radio signal.

18. The computer program product of claim 17, wherein said neural network has an input layer a neural network for at least one of said channel impulse response or said envelope function and having an output layer indicative of said angle information probability distribution.

19. The method of claim 1 wherein the sensor comprises at least one of an inertial measurement unit and a geolocation sensor, wherein the geolocation sensor provides the sensor information comprising at least one of pose and velocity information.

20. The angle estimator of claim 12 wherein the sensor comprises at least one of an inertial measurement unit and a geolocation sensor, wherein the geolocation sensor provides the sensor information comprising at least one of pose and velocity information.

21. A method for estimating angle information of an ultra-wideband radio signal, the method comprising:

receiving, by means of exactly one receiver antenna of a receiving device, said ultra-wideband radio signal, wherein said receiver antenna has an angle-dependent transfer function, deriving a channel impulse response of a propagation channel of said received ultra-wideband radio signal or an envelope function indicative of an envelope of said channel impulse response, deriving, by inputting said channel impulse response or said envelope function into a neural network, an angle information probability distribution for said ultra-wideband radio signal, and deriving, using the angle information probability distribution, state information of the receiving device.

22. An angle estimator for estimating angle information of an ultra-wideband radio signal by means of the method of claim 21, the angle estimator comprising:

a transceiver with the one receiver antenna structured for receiving said ultra-wideband radio signal, wherein said receiver antenna has the angle-dependent transfer function, a control unit structured for deriving the channel impulse response of the propagation channel of said received ultra-wideband radio signal or the envelope function indicative of the envelope of said channel impulse response, and deriving, using said channel impulse response or said envelope function, the angle information probability distribution for said ultra-wideband radio signal.

* * * * *

UNITED STATES PATENT AND TRADEMARK OFFICE
CERTIFICATE OF CORRECTION

PATENT NO. : 12,261,640 B2
APPLICATION NO. : 17/636449
DATED : March 25, 2025
INVENTOR(S) : D'Andrea et al.

Page 1 of 1

It is certified that error appears in the above-identified patent and that said Letters Patent is hereby corrected as shown below:

In the Claims

In Claim 18, Column 13, Line 41, please delete "a neural network" after phrase "input layer"

In Claim 18, Column 13, Line 43, please delete "having"

Signed and Sealed this
Nineteenth Day of August, 2025

Coke Morgan Stewart
*Acting Director of the United States Patent and Trademark Office*